United States Patent
Byun et al.

(10) Patent No.: US 9,324,988 B2
(45) Date of Patent: Apr. 26, 2016

(54) RECHARGEABLE BATTERY

(71) Applicant: SAMSUNG SDI CO., LTD., Yongin-si, Gyeonggi-do (KR)

(72) Inventors: Sang-Won Byun, Yongin-si (KR); Jeong-Won Oh, Yongin-si (KR); Hyung-Sik Kim, Yongin-si (KR); Yong-Hee Yun, Yongin-si (KR); Seung-Bok Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 257 days.

(21) Appl. No.: 14/015,762

(22) Filed: Aug. 30, 2013

(65) Prior Publication Data

US 2014/0315052 A1    Oct. 23, 2014

(30) Foreign Application Priority Data

Apr. 17, 2013   (KR) .................. 10-2013-0042368

(51) Int. Cl.
| H01M 2/00 | (2006.01) |
| H01M 2/34 | (2006.01) |
| H01M 2/26 | (2006.01) |
| H01M 10/04 | (2006.01) |
| H01M 10/058 | (2010.01) |

(52) U.S. Cl.
CPC ..... *H01M 2/34* (2013.01); *H01M 2/26* (2013.01); *H01M 2/348* (2013.01); *H01M 10/0413* (2013.01); *H01M 10/058* (2013.01); *H01M 2200/103* (2013.01)

(58) Field of Classification Search
None
See application file for complete search history.

(56) References Cited

U.S. PATENT DOCUMENTS 6,040,038 A    3/2000  Momose
6,556,122 B2   4/2003  Izaki et al.
7,236,669 B2   6/2007  Asano
2005/0064286 A1*  3/2005  Kozu ............ H01M 2/1066
                                              429/180
2011/0177387 A1*  7/2011  Byun ............... H01M 2/04
                                              429/178
2011/0183166 A1*  7/2011  Suga ................ H01M 2/30
                                              429/61
2011/0300419 A1* 12/2011  Byun ................ H01M 2/22
                                              429/61
2013/0084476 A1*  4/2013  Ellis-Monaghan ... H01M 2/204
                                              429/61

FOREIGN PATENT DOCUMENTS

| EP | 2 372 808 A1 | 10/2011 |
| EP | 2 393 145 A1 | 12/2011 |
| EP | 2 521 207 A2 | 11/2012 |
| EP | 2 575 189 A1 | 4/2013 |
| JP | 2002-42621 | 2/2002 |
| JP | 2005-345701 | 12/2005 |
| KR | 1998-042680 | 8/1998 |

OTHER PUBLICATIONS

EPO Search Report dated Aug. 4, 2014, for corresponding European Patent application 13188622.8, (6 pages).

* cited by examiner

*Primary Examiner* — Patrick Ryan
*Assistant Examiner* — Jose Colucci Rios
(74) *Attorney, Agent, or Firm* — Lewis Roca Rothgerber Christie LLP

(57) ABSTRACT

A rechargeable battery including: an electrode assembly including a negative electrode and a positive electrode; a case receiving the electrode assembly; a terminal electrically connected to the electrode assembly and protruding outside the case; a current collecting member electrically connecting the terminal and the electrode assembly to each other; and an insulating member partially enclosing the current collecting member, and the current collecting member includes a plurality of fuse parts including a first fuse part enclosed by the insulating member, and a second fuse part that is not enclosed by the insulating member and is exposed.

13 Claims, 8 Drawing Sheets

RECHARGEABLE BATTERY

CROSS-REFERENCE TO RELATED APPLICATION

This application claims priority to and the benefit of Korean Patent Application No. 10-2013-0042368, filed in the Korean Intellectual Property Office on Apr. 17, 2013, the entire content of which is incorporated herein by reference.

BACKGROUND

1. Field

Aspects of embodiments of the present invention relate to a rechargeable battery.

2. Description of the Related Art

A rechargeable battery is a battery that can be charged and discharged, unlike a primary battery that is incapable of being recharged. A rechargeable battery having low capacity may be used in a portable small electronic device, such as a mobile phone, a laptop computer, and a camcorder, and a battery having large capacity is widely used as a power source for driving a motor of a hybrid vehicle, an electric vehicle, and the like.

Recently, a high-power rechargeable battery that uses a non-aqueous electrolyte having high energy density has been developed, and the high-power rechargeable battery is constituted by a large-capacity rechargeable battery in which a plurality of rechargeable batteries are coupled in series in order to be used for driving devices requiring large power, such as motors for electric vehicles, for example.

In addition, a large-capacity rechargeable battery generally includes a plurality of rechargeable batteries that are coupled in series, and the rechargeable battery may be formed in cylindrical or angular shapes, for example.

If an overcurrent flows through a rechargeable battery having a case that is made of material such as a metal, since the temperature of the rechargeable battery increases, there is a risk of ignition. In addition, if the internal pressure of the rechargeable battery increases because of decomposition of the electrolyte solution in the rechargeable battery due to the overcurrent, there is a risk of explosion of the rechargeable battery.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a rechargeable battery has improved safety. According to an aspect of embodiments of the present invention, in a rechargeable battery, a structure of a safety apparatus that is capable of decreasing a risk when an overcurrent occurs is improved.

According to one or more exemplary embodiments of the present invention, a rechargeable battery includes: an electrode assembly including a negative electrode and a positive electrode; a case receiving the electrode assembly; a terminal electrically connected to the electrode assembly and protruding outside the case; a current collecting member electrically connecting the terminal and the electrode assembly to each other; and an insulating member partially enclosing the current collecting member, and the current collecting member includes a plurality of fuse parts including a first fuse part enclosed by the insulating member, and a second fuse part that is not enclosed by the insulating member and is exposed.

A fuse hole may be formed in the current collecting member, the first fuse part may be adjacent one end of the fuse hole, and the second fuse part may be adjacent an opposite end of the fuse hole. The current collecting member may include a terminal combination part fixed to the terminal, a side plate bent from the terminal combination part, and a first current collecting piece bent from the side plate and fixed to the positive electrode or the negative electrode.

The current collecting member may include a connection part connected to the side plate, and a second current collecting piece bent from the connection part and fixed to the positive electrode or the negative electrode. The insulating member may include a lower insulating part enclosing the connection part, and a current collecting insulating part enclosing the second current collecting piece bent from the connection part.

The insulating member may include an upper insulating part enclosing the terminal combination part, and the upper insulating part may include a cut part exposing the second fuse part.

The current collecting member may include a fuse hole, and the upper insulating part may include a separation supporting part inserted into the fuse hole. The insulating member may include a side insulating part enclosing the side plate, and a current collecting insulating part enclosing the first current collecting piece bent from the side plate.

The first fuse part and the second fuse part may be separated and disposed according to a width direction of the insulating member.

The current collecting member may include a first fuse hole and a second fuse hole, and the first fuse hole and the second fuse hole may be separated and disposed according to a width direction of the current collecting member.

The first fuse part may be adjacent an end of the first fuse hole, the second fuse part may be adjacent an end of the second fuse hole, and the third fuse part may be between the first fuse hole and the second fuse hole. The insulating member may include a cut part exposing the first fuse part and the second fuse part.

The insulating member may be formed by insert injection. The insulating member may include at least one selected from the group consisting of polypropylene (PP), perfluoroalkoxy (PFA), polyphenylene sulfide (PPS), and polyether ether ketone (PEEK).

According to an aspect of embodiments of the present invention, when the fuse is operated due to an overcurrent, the fuse is sequentially disconnected such that the generation of an arc is reduced, thereby improving safety.

BRIEF DESCRIPTION OF THE DRAWINGS

The above and other features and aspects of the present invention will become more apparent by describing in further detail some exemplary embodiments thereof with reference to the attached drawings.

Figure 1:
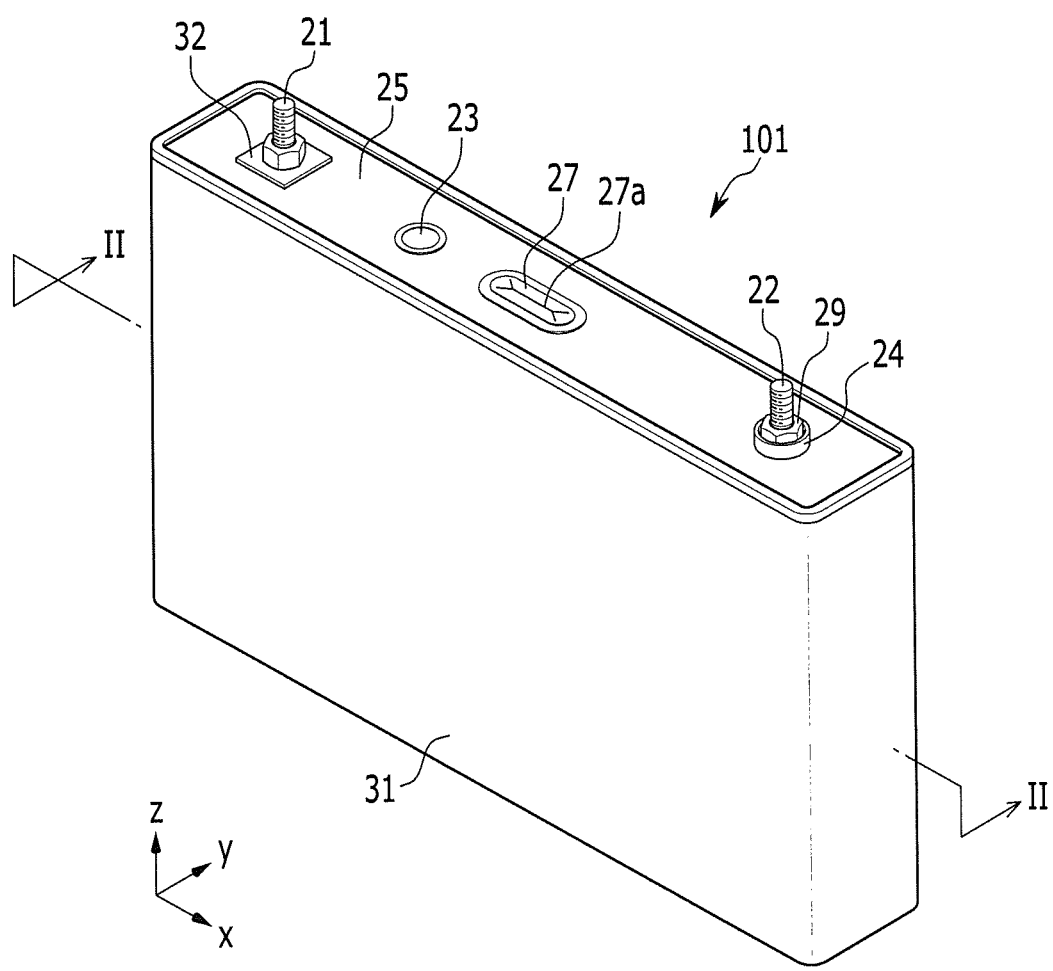
FIG. 1 is a perspective view of a rechargeable battery according to an exemplary embodiment of the present invention.

Description of Reference Numerals Indicating Some Elements in the Drawings

| | |
|---|---|
| 101: rechargeable battery | 10: electrode assembly |
| 11: positive electrode | 12: negative electrode |
| 21: positive electrode terminal | 22: negative electrode terminal |
| 25: cap plate | 31: case |
| 35, 36: lower insulating member | 51, 52: current collecting member |
| 512: terminal combination part | 512a: supporting hole |
| 512b: fuse hole | 513: side plate |
| 515: first fuse part | 514: second fuse part |
| 516: connection part | 517, 518: current collecting piece |
| 61: insulating member | 612: upper insulating part |
| 613: cut part | 614: separation supporting part |
| 615: side insulating part | 616: lower insulating part |
| 617, 618: current collecting insulating part | |

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
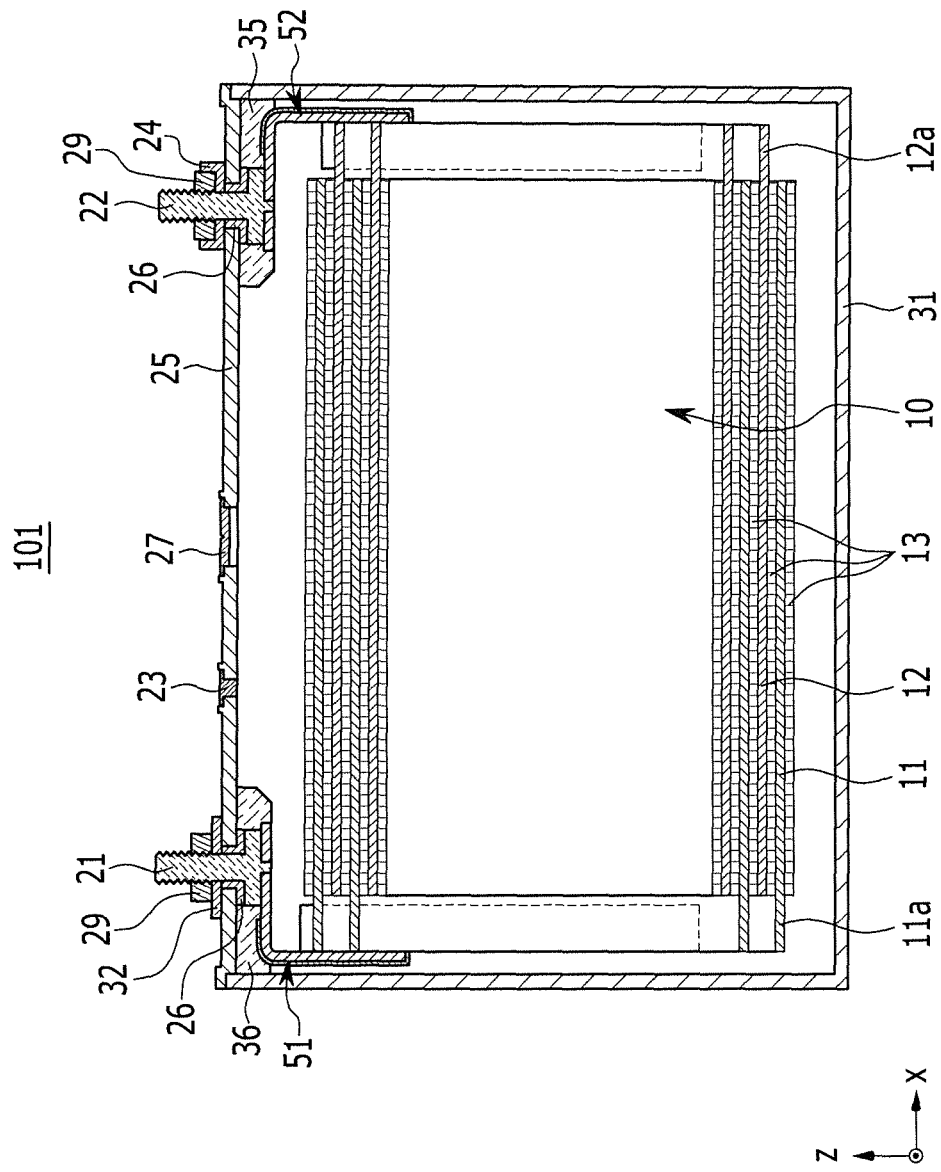
FIG. 2 is a cross-sectional view of the rechargeable battery of FIG. 1, taken along the line II-II.

FIG. 1 is a perspective view of a rechargeable battery according to an exemplary embodiment of the present invention; and FIG. 2 is a cross-sectional view of the rechargeable battery of FIG. 1, taken along the line II-II.

Referring to FIGS. 1 and 2, a rechargeable battery 101 according to one exemplary embodiment includes an electrode assembly 10 wound with a separator 13 between a positive electrode 11 and a negative electrode 12, a case 31 in which the electrode assembly 10 is disposed, a cap plate 25 coupled to an opening of the case 31, and a positive electrode terminal 21 and a negative electrode terminal 22 penetrating the cap plate to be installed.

The rechargeable battery 101 according to one embodiment may be a rectangular lithium ion rechargeable battery. However, the present invention is not limited thereto, and aspects of the present invention can be applied to various types of batteries, such as a lithium polymer battery or a cylindrical battery.

The positive electrode 11 includes a positive coated region that is an area where an active material is coated to a current collector that is formed of a thin film metal foil that is made of aluminum or the like, for example, and a positive uncoated region 11a that is an area not coated with the active material. The negative electrode 12 includes a negative coated region that is an area where an active material is coated to a current collector that is formed of a thin film metal foil that is made of copper or the like, for example, and a negative uncoated region 12a that is an area not coated with the active material.

The positive electrode uncoated region 11a is formed at one end of the positive electrode 11 along a lengthwise direction of the electrode assembly 10, and the negative electrode uncoated region 12a is formed at the other end of the negative electrode 12 along the lengthwise direction of the electrode assembly 10. The separator 13, which is an insulator, is interposed between and wound together with the positive electrode 11 and the negative electrode 12.

However, the present invention is not limited thereto, and the electrode assembly 10 may have a structure in which a plurality of positive electrodes and negative electrodes formed in a sheet shape are stacked with a separator interposed therebetween.

The case 31, in one embodiment, has a generally cuboid shape, and an opening is formed at a side thereof. The cap plate 25 is coupled to the opening of the case 31 and may be made of a thin metal plate. The cap plate 25 is installed with the positive electrode terminal 21 which protrudes outwardly from the cap plate 25 and is electrically connected with the positive electrode 11, and the negative electrode terminal 22 which protrudes outwardly from the cap plate 25 and is electrically connected with the negative electrode 12.

The cap plate 25, in one embodiment, has an electrolyte injection opening for injecting an electrolyte solution, and a seal stopper 23 for sealing the electrolyte injection opening is installed to the cap plate 25. In one embodiment, the cap plate 25 includes a vent member 27 in which a notch 27a is formed such that the vent member 27 may be broken according to an internal pressure (e.g., a predetermined internal pressure).

The positive electrode terminal 21 is formed penetrating the cap plate 25, and a lower gasket 26 for sealing is installed between the cap plate 25 and the positive electrode terminal 21. The positive electrode terminal 21 may have a circular cylinder shape on which a screw thread is formed at an external circumference thereof, and the positive electrode terminal 21 may include a nut 29 supporting the positive electrode terminal 21 at the upper side. In one embodiment, a connection plate 32 is installed between the cap plate 25 and the nut 29 at the positive electrode terminal 21.

After the positive electrode terminal 21 is inserted into and combined with the connection plate 32, the nut 29 is coupled on the connection plate 32. The connection plate 32 electrically connects the positive electrode terminal 21 and the cap plate 25. Accordingly, in one embodiment, the cap plate 25 and the case 31 are electrically connected to the positive electrode 11. In one embodiment, a lower insulating member 36 supporting a current collecting member 51 and the positive electrode terminal 21 is installed under the cap plate 25. The positive electrode terminal 21 is electrically connected to the positive electrode uncoated region 11a via the current collecting member 51, and a terminal flange coupled to the current collecting member 51 may be formed under the positive electrode terminal 21.

In one embodiment, the negative electrode terminal 22 penetrates the cap plate 25 to be installed, and a lower gasket 26 for sealing is installed between the cap plate 25 and the negative electrode terminal 22. The negative electrode terminal 22 may have a circular cylinder shape on which a screw thread is formed at an external circumference thereof, and the negative electrode terminal 22 may include a nut 29 supporting the negative electrode terminal 22. In one embodiment, an upper gasket 24 for sealing and insulating is installed between the cap plate 25 and the nut 29 at the negative electrode terminal 22.

In one embodiment, a lower insulating member 35 insulating and supporting a current collecting member 52 and the negative electrode terminal 22 is installed under the negative electrode terminal 22. The negative electrode terminal 22 is electrically connected to the negative uncoated region 12a via the current collecting member 52, and a terminal flange coupled to the current collecting member 52 may be formed at a lower end of the negative electrode terminal 22.

Figure 3:
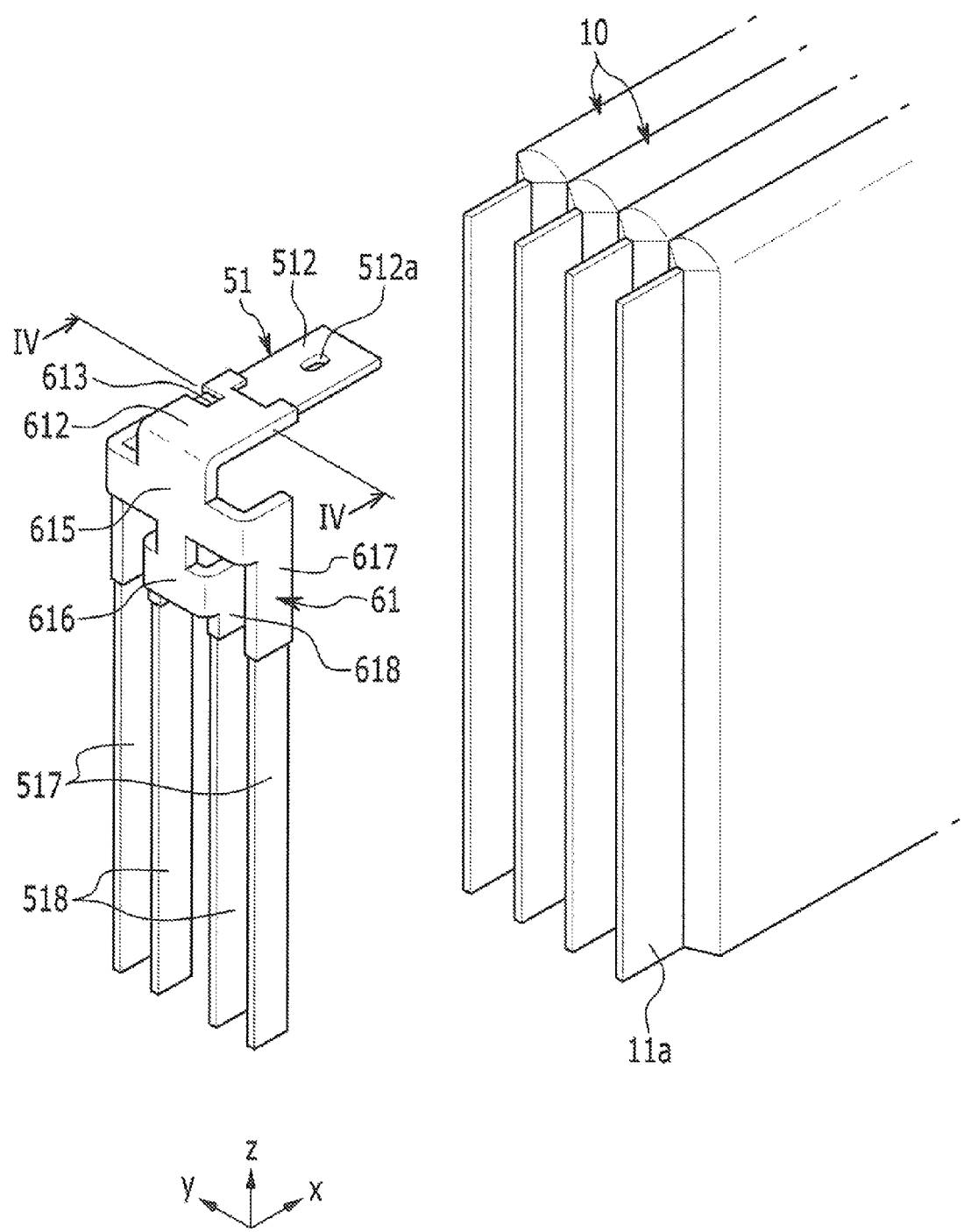
FIG. 3 is a partial exploded perspective view of electrode assemblies and a current collecting member of the rechargeable battery of FIG. 1, according to an exemplary embodiment of the present invention.
Figure 4:
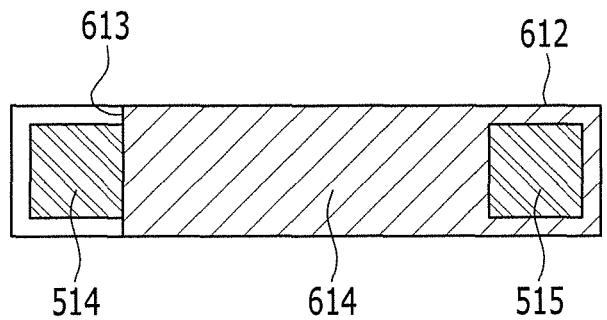
FIG. 4 is a cross-sectional view taken along the line IV-IV of FIG. 3.

FIG. 3 is a partial exploded perspective view of electrode assemblies 10 and the current collecting member 51 of the rechargeable battery 101, according to an exemplary embodiment of the present invention; FIG. 4 is a cross-sectional view taken along the line IV-IV of FIG. 3; and FIG. 5 is a partial perspective view of the current collecting member 51.

Figure 5:
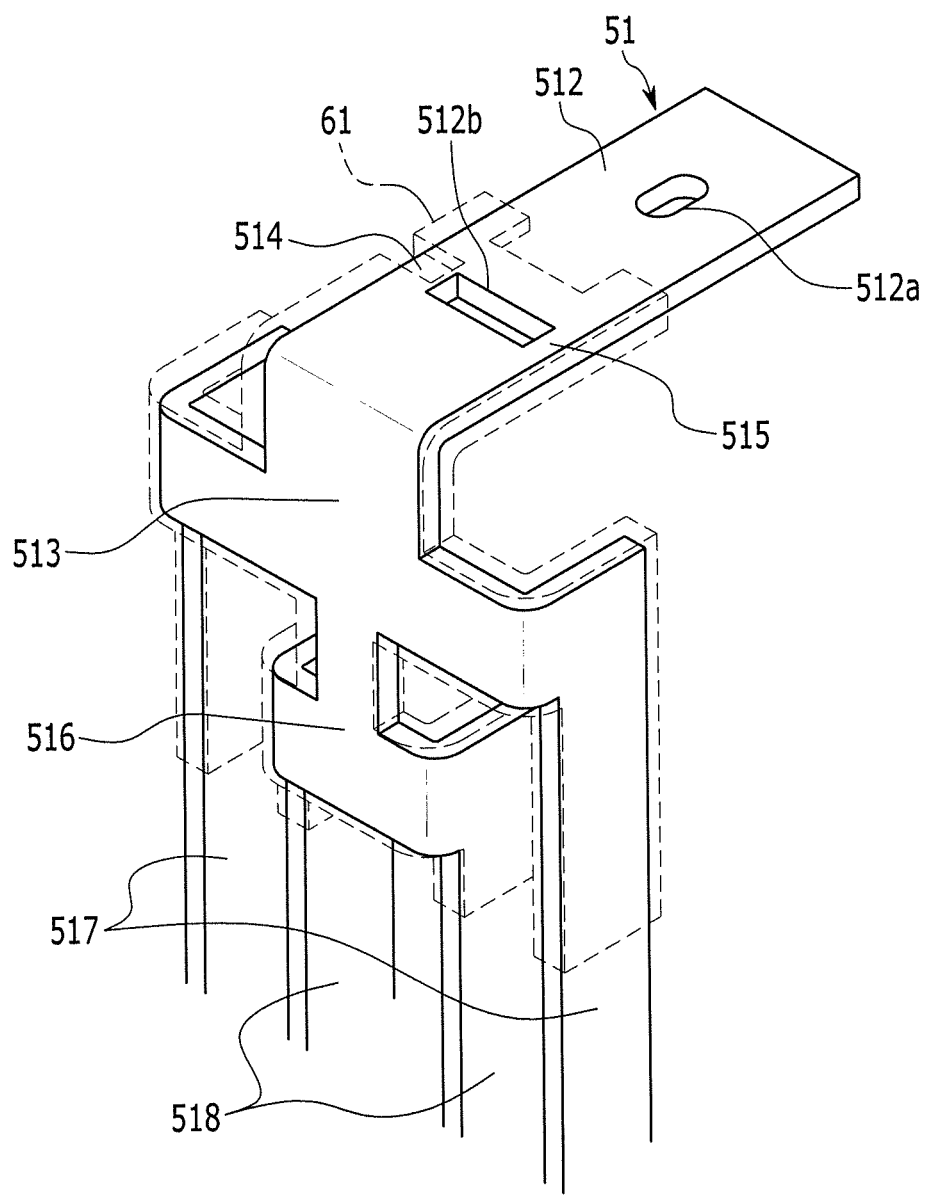
FIG. 5 is a partial perspective view of the current collecting member of FIG. 3.

Referring to FIG. 3 to FIG. 5, the rechargeable battery 101, according to one embodiment, includes four electrode assemblies 10. However, the present invention is not limited thereto, and the rechargeable battery according to embodiments of the present invention may include one electrode assembly or any other suitable number of electrode assemblies.

The current collecting member 51 includes a terminal combination part 512 fixed to the positive electrode terminal 21, a side plate 513 formed to be bent from the terminal combination part 512, current collecting pieces 517 and 518 fixed to the positive electrode uncoated regions 11a, and a first fuse part 515 and a second fuse part 514 formed at the terminal combination part 512.

The current collecting member 52 installed at and coupled to the negative electrode terminal 22 may have a same structure as the current collecting member 51 installed at and coupled to the positive electrode terminal 21, and, therefore, description thereof is not repeated herein.

The terminal combination part 512, in one embodiment, has a quadrangular plate-like shape, and has a supporting hole 512a in which the positive electrode terminal 21 is inserted at the center. Also, the terminal combination part 512 may be coupled under the positive electrode terminal 21 by welding. The side plate 513 is bent perpendicularly toward a bottom of the case 31 from the terminal combination part 512, thereby being disposed parallel to a side surface of the case 31.

Two current collecting pieces 517, in one embodiment, are connected to respective ends of the side plate 513 and are coupled to the positive electrode uncoated region 11a by welding, for example. A connection part 516, in one embodiment, is formed under the side plate 513, and two current collecting pieces 518 coupled to the positive electrode uncoated region 11a by welding, for example, are connected to respective ends of the connection part 516.

The current collecting piece 517 is coupled to the positive electrode uncoated region 11a by welding in a state that the current collecting piece 517 is bent at both ends of the side plate 513 and is disposed parallel to the positive electrode uncoated region 11a. The current collecting piece 517 is coupled to the electrode assembly 10 that is disposed outside among the electrode assemblies 10. Also, the current collecting piece 518 is coupled to the positive electrode uncoated region 11a by welding in a state that the current collecting piece 518 is bent at both end of the connection part 516 and is disposed parallel to the positive electrode uncoated region 11a. The current collecting piece 517 is coupled to the electrode assembly 10 that is positioned outside among the electrode assemblies 10, and the current collecting piece 518 is coupled to the electrode assembly 10 that is positioned inside among the electrode assemblies 10.

The terminal combination part 512, in one embodiment, includes a fuse hole 512b, and the fuse hole 512b is separated and disposed toward a side of the case 31 from the supporting hole 512a. The first fuse part 515 is formed to contact one end of the fuse hole 512b and the second fuse part 514 is formed to contact the other end of the fuse hole 512b. The first fuse part 515 and the second fuse part 514, in one embodiment, are disposed parallel to each other in a width direction of the terminal combination part 512 and are separated by the fuse hole 512b.

As a result of the fuse hole 512b, a sum of cross-sectional areas of the first fuse part 515 and the second fuse part 514 is smaller than a cross-sectional area of other portions of the current collecting member 51, such that the first fuse part 515 and the second fuse part 514 are melted to cut off the current when an overcurrent flows to the current collecting member 51.

Figure 6:
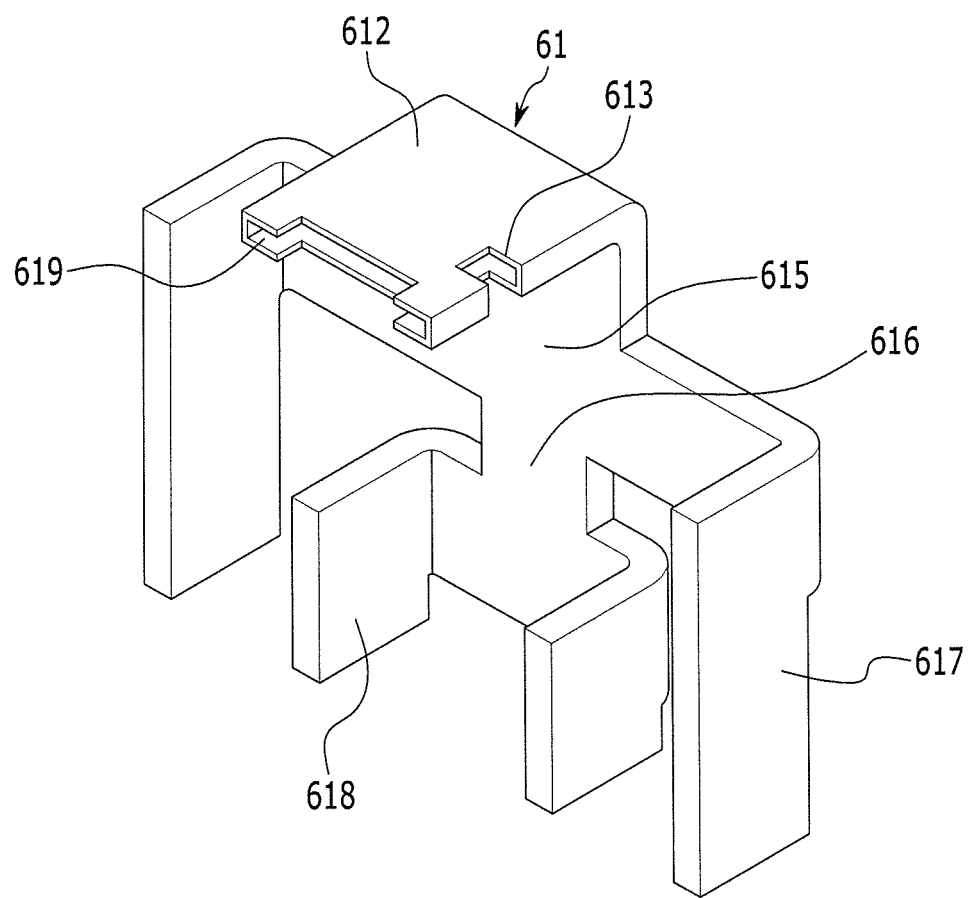
FIG. 6 is a perspective view of an insulating member of the rechargeable battery of FIG. 1, according to an exemplary embodiment of the present invention.

FIG. 6 is a perspective view of an insulating member of the rechargeable battery 101, according to an exemplary embodiment of the present invention.

Referring to FIG. 4 to FIG. 6, the current collecting member 51 includes an insulating member 61 for insulating and preventing or substantially preventing an arc, and, in one embodiment, the insulating member 61 is formed to partially enclose the current collecting member 51. The insulating member 61, in one embodiment, is installed to enclose the side plate 513 and the connection part 516 and a portion of the terminal combination part 512 and the current collecting pieces 517 and 518.

The insulating member 61, in one embodiment, is formed by an insert injection method to enclose from the terminal combination part 512 to an upper portion of the current collecting pieces 517 and 518. The insulating member 61, in one embodiment, may be formed of polypropylene (PP), perfluoroalkoxy (PFA), polyphenylene sulfide (PPS), and polyether ether ketone (PEEK), for example. The insulating member 61 is coated with a thin thickness to the surface of the current collecting member 51 to prevent or substantially prevent the current collecting member 51 from contacting the case 31 and to block an arc generated in the current collecting member 51 from contacting the electrolyte solution. If the arc generated in the current collecting member 51 contacts the electrolyte solution, the electrolyte solution may combust or explode because of high heat.

The insulating member 61, in one embodiment, includes an upper insulating part 612 enclosing the terminal combination part 512, a side insulating part 615 enclosing the side plate 513, a lower insulating part 616 enclosing the connection part 516, and a plurality of current collecting insulating parts 617 and 618 enclosing upper portions of the current collecting pieces 517 and 518. The insulating member 61 has an inner space 619 to insert or accommodate the current collecting member 51. The side insulating part 615 is bent with respect to the upper insulating part 612 and is connected at the lower side of the upper insulating part 612, and the lower insulating part 616 is positioned under the side insulating part 615. The current collecting insulating part 617 is curved at the side insulating part 615, and the current collecting insulating part 618 is curved at the lower insulating part 616.

As shown in FIG. 4 and FIG. 6, the upper insulating part 612 includes a cut part 613, and the cut part 613 exposes the second fuse part 514. The first fuse part 515 is enclosed by the insulating member 61, and the second fuse part 514 is exposed through the cut part 613. Also, as shown in FIG. 4, the insulating member 61 has a separation supporting part 614 inserted into the fuse hole 512b. The separation supporting part 614 is inserted into the fuse hole 512b such that the melted portions do not contact each other and maintain the separated state when the first and second fuse parts 515, 514 are melted.

In the present exemplary embodiment, the first fuse part 515 is covered by the insulating member 61, and the second fuse part 514 is exposed, and the second fuse part 514 is melted before the first fuse part 515. Also, the first fuse part 515 is melted when a time has passed after the second fuse part 514 is melted. This is because the heat is dissipated in the case of the first fuse part 515 covered by the insulating member 61. The insulating member 61 transmits the heat generated in the first fuse part 515 such that the melting of the first fuse part 515 is delayed.

In a case in which the first fuse part and the second fuse part are both enclosed by the insulating member, the first fuse part and the second fuse part are simultaneously or concurrently melted. Also, when the fuse is melted, a large arc is generated, and when the arc is generated, the remaining material of the current collecting member and the remaining material of the insulating member are mixed while the insulating member is melted. Accordingly, a larger amount of remaining material is generated by the secondary contact of the arc of remaining material such that the rechargeable battery may explode or combust because of this arc.

However, in the present exemplary embodiment, only the first fuse part 515 of the first and second fuse parts 515, 514 is enclosed by the insulating member 61, whereby the first fuse part 515 remains connected when the second fuse part 514 is melted such that the arc is not generated. Also, in the state that the second fuse part 514 is melted first, the first fuse part 515 is melted such that the size of the arc may be relatively reduced, and thereby explosion and combustion may be prevented or substantially prevented.

Figure 7:
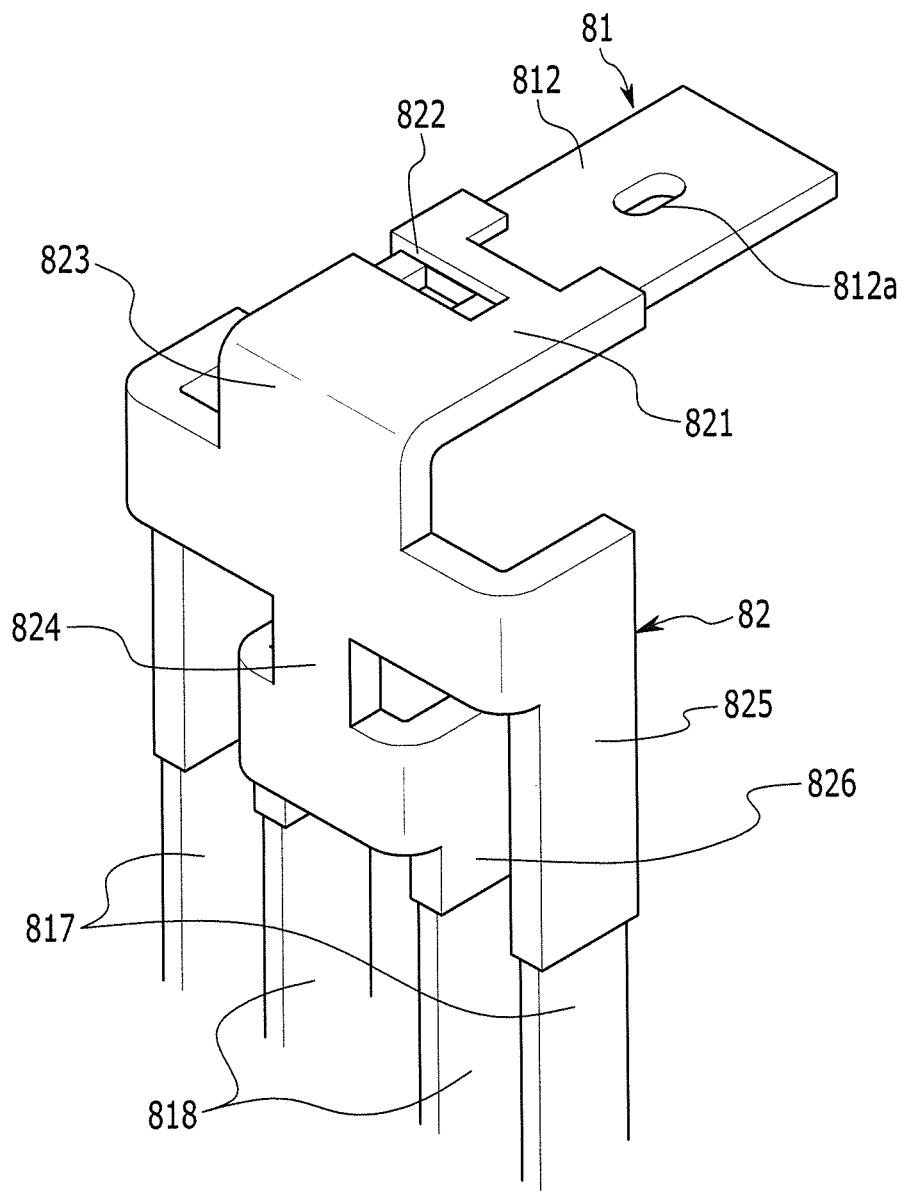
FIG. 7 is a partial perspective view of a current collecting member and an insulating member according to another exemplary embodiment of the present invention.
Figure 8:
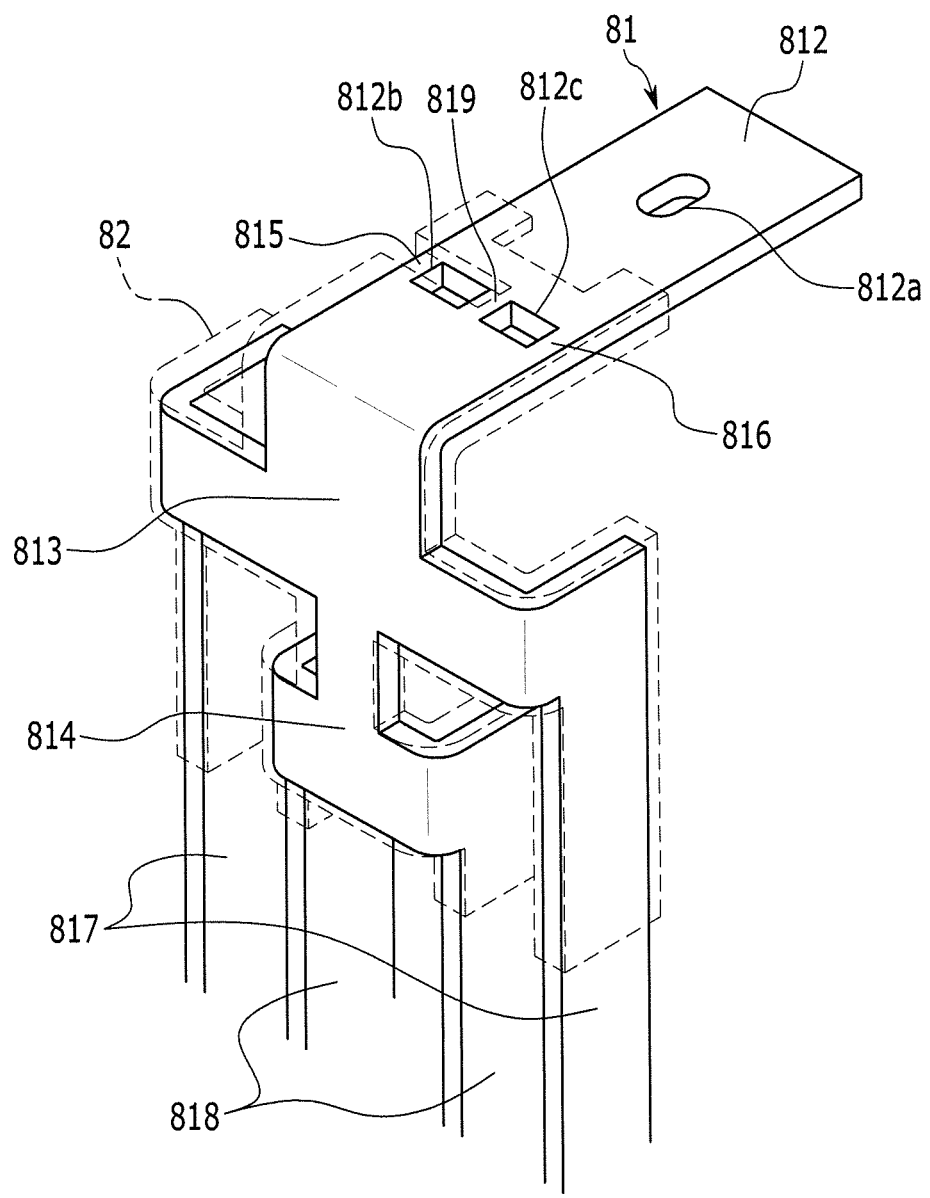
FIG. 8 is a partial perspective view of the current collecting member of FIG. 7.

FIG. 7 is a partial perspective view of a current collecting member and an insulating member according to another exemplary embodiment of the present invention; and FIG. 8 is a partial perspective view of the current collecting member of FIG. 7.

Referring to FIG. 7 and FIG. 8, a rechargeable battery according to another exemplary embodiment of the present invention is described below. The rechargeable battery according to another exemplary embodiment is the same as the rechargeable battery 101 described above except for a current collecting member and an insulating member, and, therefore, description of same components will not be repeated herein.

The rechargeable battery according to another exemplary embodiment includes a current collecting member 81 which includes a terminal combination part 812 fixed to the positive electrode terminal 21, a side plate 813 bent from the terminal combination part 812, current collecting pieces 817 and 818 fixed to the positive electrode uncoated regions 11*a*, and a first fuse part 816, a second fuse part 815, and a third fuse part 819 formed at the terminal combination part 812.

The terminal combination part 812, in one embodiment, is formed in the shape of a square or rectangular plate, and includes a supporting hole 812*a* in which the positive electrode terminal 21 is inserted at the center. Also, the terminal combination part 812 may be coupled under the positive electrode terminal 21 by welding. The side plate 813 is bent perpendicular toward the bottom of the case 31 from the terminal combination part 812, thereby being disposed parallel to the side surface of the case 31.

Two current collecting pieces 817, in one embodiment, are connected to both ends of the side plate 813 and are coupled to the positive electrode uncoated region 11*a* by welding, for example. In one embodiment, a connection part 814 is formed under the side plate 813, and two current collecting pieces 818 coupled to the positive electrode uncoated region 11*a* by welding, for example, are connected to both ends of the connection part 814.

The terminal combination part 812 includes a first fuse hole 812*b* and a second fuse hole 812*c*, and the first fuse hole 812*b* and the second fuse hole 812*c* are disposed to be separated toward a side of the case from the supporting hole 812*a*. The first fuse hole 812*b* and the second fuse hole 812*c*, in one embodiment, are disposed parallel to each other along the width direction of the terminal combination part 812.

The first fuse part 816 is formed to contact one end of the second fuse hole 812*c*, the second fuse part 815 is formed to contact one end of the first fuse hole 812*b*, and the third fuse part 819 is formed between the first fuse hole 812*b* and the second fuse hole 812*c*.

The first fuse part 816, the second fuse part 815, and the third fuse part 819, in one embodiment, are disposed parallel to each other according to the width direction of the terminal combination part 812. The first fuse part 816 and the third fuse part 819 are separated by the second fuse hole 812*c*, and the second fuse part 815 and the third fuse part 819 are separated by the first fuse hole 812*b*.

As a result of the first fuse hole 812*b* and the second fuse hole 812*c*, a sum of cross-sectional areas of the first fuse part 816, the second fuse part 815, and the third fuse part 819 is smaller than a cross-sectional area of other portions of the current collecting member 81, such that the first fuse part 816, the second fuse part 815, and the third fuse part 819 are melted when an overcurrent flows to the current collecting member 81, thereby blocking the current.

An insulating member 82 for insulating and preventing or substantially preventing an arc is formed at a current collecting member 81, and the insulating member 82 partially encloses the current collecting member 81. The insulating member 82, in one embodiment, encloses the side plate 813 and the connection part 814 and encloses a portion of the terminal combination part 812 and the current collecting pieces 817 and 818.

The insulating member 82, in one embodiment, includes an upper insulating part 821 enclosing the terminal combination part 812, a side insulating part 823 enclosing the side plate 813, a lower insulating part 824 enclosing the connection part 814, and a plurality of current collecting insulating parts 825 and 826 enclosing upper portions of the current collecting pieces 817 and 818.

The upper insulating part 821 includes a cut part 822, and the cut part 822 exposes the second fuse part 815 and the third fuse part 819. Accordingly, the first fuse part 816 is enclosed by the insulating member 82, and the second fuse part 815 and the third fuse part 819 are exposed through the cut part 822.

In the present exemplary embodiment, the first fuse part 816 is covered by the insulating member 82, and the second fuse part 815 and the third fuse part 819 are exposed, and the second fuse part 815 and the third fuse part 819 are melted first compared to the first fuse part 816. Also, the first fuse part 816 is melted when a time has passed after the second fuse part 815 is melted. This is because the heat is easily emitted in the case of the first fuse part 816 covered by the insulating member 82. The insulating member 82 transmits the heat generated in the first fuse part 816 in the side such that the melting of the first fuse part 816 is delayed.

In the present exemplary embodiment, in which only the first fuse part 816 is enclosed by the insulating member 82, the first fuse part 816 is connected when the second fuse part 815 and the third fuse part 819 are melted, such that the arc is not generated. Also, in the state that the second fuse part 815 and the third fuse part 819 are melted first, the first fuse part 816 is melted such that the size of the arc may be relatively reduced, thereby preventing or substantially preventing explosion and combustion.

While this invention has been described in connection with what are presently considered to be some exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly comprising a negative electrode and a positive electrode;
a case receiving the electrode assembly;
a terminal electrically connected to the electrode assembly and protruding outside the case;
a current collecting member electrically connecting the terminal and the electrode assembly to each other; and
an insulating member partially enclosing the current collecting member,
wherein the current collecting member includes a plurality of fuse parts including a first fuse part enclosed by the insulating member, and a second fuse part that is not enclosed by the insulating member and is exposed, wherein a portion of the insulating member encloses a surface of the first fuse part facing the electrode assembly, and
wherein a fuse hole is formed in the current collecting member, the first fuse part is adjacent one end of the fuse hole, and the second fuse part is adjacent an opposite end of the fuse hole.

2. The rechargeable battery of claim 1, wherein the current collecting member comprises:
a terminal combination part fixed to the terminal;
a side plate bent from the terminal combination part; and
a first current collecting piece bent from the side plate and fixed to the positive electrode or the negative electrode.

3. The rechargeable battery of claim 2, wherein the current collecting member further comprises:
a connection part connected to the side plate; and
a second current collecting piece bent from the connection part and fixed to the positive electrode or the negative electrode.

4. The rechargeable battery of claim 3, wherein the insulating member comprises:
a lower insulating part enclosing the connection part; and
a current collecting insulating part enclosing the second current collecting piece bent from the connection part.

5. The rechargeable battery of claim 2, wherein the insulating member comprises an upper insulating pan enclosing the terminal combination part, and the upper insulating part includes a cut part exposing the second fuse part.

6. The rechargeable battery of claim 5, wherein the upper insulating part includes a separation supporting part inserted into the fuse hole.

7. The rechargeable battery of claim 5, wherein the insulating member includes a side insulating part enclosing the side plate, and a current collecting insulating part enclosing the first current collecting piece bent from the side plate.

8. The rechargeable battery of claim 1, wherein the first fuse part and the second fuse part are separated and disposed according to a width direction of the insulating member.

9. The rechargeable battery of claim 1, wherein the fuse hole includes a first fuse hole and a second fuse hole, and the first fuse hole and the second fuse hole are separated and disposed according to a width direction of the current collecting member.

10. The rechargeable battery of claim 9, wherein the first fuse part is adjacent an end of the second fuse hole, the second fuse part is adjacent an end of the first fuse hole, and a third fuse part of the plurality of fuse parts is between the first fuse hole and the second fuse hole.

11. The rechargeable battery of claim 10, wherein the insulating member includes a cut part exposing the third fuse part and the second fuse part.

12. The rechargeable battery of claim 1, wherein the insulating member is formed by insert injection.

13. The rechargeable battery of claim 1, wherein the insulating member comprises at least one selected from the group consisting of polypropylene (PP), perfluoroalkoxy (PFA), polyphenylene sulfide (PPS), and polyether ether ketone (PEEK).

* * * * *